(12) United States Patent
Nitsche

(10) Patent No.: US 8,145,153 B2
(45) Date of Patent: Mar. 27, 2012

(54) METHOD AND SYSTEM FOR CALIBRATING AN ANALOGUE I/Q-MODULATOR OF A TRANSMITTER

(75) Inventor: Gunnar Nitsche, Radebeul (DE)

(73) Assignee: NXP B.V., Eindhoven (NL)

( * ) Notice: Subject to any disclaimer, the term of this patent is extended or adjusted under 35 U.S.C. 154(b) by 474 days.

(21) Appl. No.: 12/441,783

(22) PCT Filed: Sep. 10, 2007

(86) PCT No.: PCT/IB2007/053634
§ 371 (c)(1), (2), (4) Date: Mar. 18, 2009

(87) PCT Pub. No.: WO2008/035247
PCT Pub. Date: Mar. 27, 2008

(65) Prior Publication Data
US 2009/0315746 A1    Dec. 24, 2009

(30) Foreign Application Priority Data

Sep. 20, 2006   (EP) .................................. 06120960
May 11, 2007   (EP) .................................. 07108024

(51) Int. Cl.
*H03C 1/62* (2006.01)
(52) U.S. Cl. .................................. 455/115.1; 455/67.14
(58) Field of Classification Search ............... 455/115.1, 455/67.14, 102
See application file for complete search history.

(56) References Cited

U.S. PATENT DOCUMENTS

| | | | |
|---|---|---|---|
| 6,298,096 B1 | 10/2001 | Burgin | |
| 7,734,261 B2 * | 6/2010 | Bury | 455/115.1 |
| 7,783,267 B1 * | 8/2010 | Harel et al. | 455/91 |
| 7,970,427 B2 * | 6/2011 | Agahi et al. | 455/522 |
| 2002/0181611 A1 * | 12/2002 | Kim | 375/296 |
| 2003/0045249 A1 | 3/2003 | Nielsen | |
| 2003/0095607 A1 | 5/2003 | Huang et al. | |
| 2004/0230393 A1 | 11/2004 | Andersson | |
| 2005/0075815 A1 | 4/2005 | Webster et al. | |

FOREIGN PATENT DOCUMENTS

| | | |
|---|---|---|
| EP | 04106643 | 6/2006 |
| WO | 2006064435 A | 6/2006 |

OTHER PUBLICATIONS

International Preliminary Report on Patentability for Int'l. Patent Appln. No. PCT/IB2007/053634 (Mar. 24, 2009).
Gautschi, Walter; "Numberical Analysis: An Introduction"; Jan. 1, 1997; p. 225; Birkhauser; Boston, MA, US; XP002471920.

\* cited by examiner

Primary Examiner — Henry Choe

(57) ABSTRACT

The invention relates to a method and a system for calibrating an analogue I/Q-modulator (2) of a transmitter (3), wherein a calibration signal ($s(t_k)$) is transmitted and an in-phase signal ($s_I(t_k)$) and a quadrature-phase signal ($s_Q(t_k)$) of the calibration signal ($s(t_k)$) are adjusted by at least one predetermined compensation coefficient (C, D, E) in two calibration steps in at least one compensation measurement set ($u_n, V_n, W_n$), whereby: —in a first calibration step, the calibration signal ($s(t_k)$) is adjusted by a first complex compensation value ($C_{n,1}, D_{n,1}, E_{n,1}$) and an output signal of the detector circuit (20) is correlated with a harmonic ($H_1, H_2$) of said calibration signal ($s(t_k)$) to yield a first complex compensation measurement result ($u_{n,1}, V_{n,1}, W_{n,1}$), —in a second calibration step, the calibration signal ($s(t_k)$) is adjusted by a second complex compensation value ($C_{n,2}, D_{n,2}, E_{n,2}$) and the output signal of the detector circuit (20) is correlated with said harmonic ($H_1, H_2$) of said calibration signal ($s(t_k)$) to yield a second complex compensation measurement result ($u_{n,2}, V_{n,2}, W_{n,2}$), —a next optimum compensation value ($C_n, D_n, E_n$) of the complex compensation coefficient (C, D, E) is determined on said complex compensation values ($C_{n,1}, C_{n,2}, D_{n,1}, D_{n,2}, E_{n,1}, E_{n,2}$) and said complex compensation measurement results ($u_{n,1}, U_{n,2}, V_{n,1}, V_{n,2}, W_{n,1}, W_{n,2}$).

40 Claims, 1 Drawing Sheet

METHOD AND SYSTEM FOR CALIBRATING AN ANALOGUE I/Q-MODULATOR OF A TRANSMITTER

FIELD OF THE INVENTION

The invention relates to a method and a system for calibrating an analogue I/Q-modulator of a transmitter used in a digital communication system.

BACKGROUND OF THE INVENTION

Modern communication or transmit systems are based on digital signal processing technology. Such communication systems can transmit and receive signals. Digital communication techniques are used in almost all areas of wireless communication such as radio communication, telecommunication and local area networks. Digital communication is based on a special class of communication signals, sent by a transmitter and received by a receiver, using digital modulation techniques. These techniques make use of a class of signal modulators, which perform vector or quadrature modulation. A vector-modulated or quadrature-modulated signal is an amplitude and phase modulated signal that is modulated according to in-phase and quadrature-phase components, which define a phase vector. In vector or quadrature modulation, two modulation input signals independently modulate the in-phase component or signal (I) and the quadrature-phase component or signal (Q) of a carrier signal. A usual digital transmitter architecture comprises an up-conversion of the transmit signal from baseband to the RF carrier frequency by a tunable or fixed analog I/Q modulator (=I/Q up-conversion).

However, unavoidable imbalances between I- and Q-branches in the analog part of the transmitter lead to an insufficient suppression of the image signal. Due to hardware tolerances a perfectly balanced analog I/Q modulator is not feasible, resulting in a limited suppression of the image signal. The main issues in designing a I/Q modulator are compensation of the I/Q imbalance by maintenance of quadrature phase between I and Q channels (i.e. minimization of amplitude and/or phase errors between I and Q channels) and minimization of direct current (DC) offsets (i.e. minimization of carrier leakage). Each of these factors can introduce distortion into the transmitted signal which can result in an increased bit-error rate at the receiver. Furthermore, these factors vary with temperature, device biasing, component aging and frequency, often making readjustment during operation necessary. Therefore the effects of I/Q imbalance must be compensated, e.g. by using digital signal processing.

Digital compensation of analog I/Q imbalance has been widely described in different documents. Most publications consider I/Q imbalances at the receiver. Because here the analog imbalances occur before the digital part, a straightforward compensation technique based on adaptive filtering or blind coefficient estimation can be realized.

Other systems use compensation of I/Q imbalances at the transmitter. Such methods are much more difficult. The U.S. Pat. No. 6,298,096 B1 describe a transmit modulator which uses a quadrature modulator having a predistortion block which produces a pre-distorted output signal. The predistortion block pre-compensates errors introduced by the quadrature modulator based on a set of predistortion coefficients. The quadrature modulator receives the output signals from the predistortion block. The quadrature modulator up-converts the I and Q channel signals and combines them. In the process, the quadrature modulator introduces errors. In calibration mode, a sinusoidal wave at a calibration frequency is applied to the input of the predistortion block and a transformer is coupled to the output of the quadrature modulator. The transformer produces a digital representation of a spectrum of the output of the quadrature modulator converted to baseband. Spurious energy produced by the quadrature modulator errors but reduced by the effect of the predistortion block is generated at the calibration frequency and the double of the calibration frequency. A quadric polynomial minimization calculator receives the output of the transformer. The quadratic polynomial minimization calculator determines a subsequent value of the predistortion coefficients based upon a quadratic relationship between energies present in the digital representation of the spectrum of the output of the quadrature modulator at the calibration frequencies and the values of the previous predistortion coefficients. This prior art compensation method bases on re-executed iterative process. After an initial determination has been made, each time the iterative compensation process is re-executed, the previous values of the predistortion coefficients are used as a starting point. This process requires extra time to converge upon optimal values.

Furthermore, the EP 04106643.2 describes another method for LO leakage and I/Q mismatch calibration. This calibration method bases on the adjustment of a calibration signal by at least one predetermined compensation coefficient. This compensation coefficient is determined in three calibration steps. This process requires also extra time to converge upon optimal compensation values.

OBJECT OF THE INVENTION

Therefore, it is an object of the invention to provide a method and a system for calibrating an analogue I/Q-modulator of a transmitter used in digital communication system which does not consume an excessive amount of processing time and power.

This problem is solved by a calibrating method comprising the attributes given in claim 1.

Advantageous embodiments of the invention are given in the dependent claims.

According to the invention, a calibration signal $s(t_k)$ is transmitted and an in-phase signal $s_I(t_k)$ and a quadrature-phase signal $s_Q(t_k)$ of the calibration signal $s(t_k)$ are adjusted by at least one predetermined compensation coefficient in two calibration steps in at least one compensation measurement set. The two calibration steps are subdivided in a first and second calibration step. In the first calibration step, the calibration signal is adjusted by a first complex compensation value and an output signal of a detector circuit is correlated with a harmonic of said calibration signal $s(t_k)$ to yield a first complex compensation measurement result. In the second calibration step, the calibration signal $s(t_k)$ is adjusted by a second complex compensation value and the output signal of the detector circuit is correlated with said harmonic of said calibration signal $s(t_k)$ to yield a second complex compensation measurement result. Subsequently, the next optimum compensation value of at least one of the complex compensation coefficients is determined on the respective complex compensation values and the respective complex compensation measurement results.

Such calibration method reduced to two calibration measurement steps results in a simple and quick process to calibrate an I/Q modulator in a transmitter with predetermined compensation coefficients compensating amplitude and/or phase imbalance and DC offsets or as wish other signal impairment. Advantageously, the calibration process is based on a linear compensation, which allows reducing the number of calibration measurement stages to only two calibration stages described in the following.

In accordance with an aspect of the invention, one of the compensation coefficients represents a complex I/Q compensation coefficient for I/Q compensation. For a graduate calibration method, different predetermined complex I/Q compensation values are applied coarse and fine I/Q compensation coefficients. Other compensation coefficients represent coarse and fine DC compensation coefficients. In the calibration method each compensation coefficient is applied by two compensation values.

In other words: Whether I/Q compensation or DC compensation is provided or both are provided, in a first calibration step the calibration signal is adjusted by a first complex compensation value. In this step the output signal of the detector circuit is correlated with a harmonic of said calibration signal, e.g. with the second harmonic to yield a first complex I/Q compensation measurement result or with the first harmonic (=fundamental frequency) to yield a first complex DC compensation measurement result. In the second calibration step, the calibration signal is adjusted by a second complex compensation value. In this step the output signal of the detector circuit is correlated with said harmonic of the calibration signal, e.g. with the second harmonic to yield a second complex I/Q compensation measurement result or with the first harmonic (=fundamental frequency) to yield a second complex DC compensation measurement result. The next optimum compensation value is determined on said complex compensation values and said complex compensation measurement results given by:

For I/Q compensation with the I/Q compensation coefficient C:

$$C_n = (u_{n,2} \cdot C_{n,1} - u_{n,1} \cdot C_{n,2}) / (u_{n,2} - u_{n,1}).$$

For coarse DC compensation with the coarse DC compensation coefficient E:

$$E_n = (v_{n,2} \cdot E_{n,1} - v_{n,1} \cdot E_{n,2}) / (v_{n,2} - v_{n,1}).$$

For fine DC compensation with the fine DC compensation coefficient D:

$$D_n = (w_{n,2} \cdot D_{n,1} - w_{n,1} \cdot D_{n,2}) / (w_{n,2} - w_{n,1}).$$

In another embodiment of the invention, for each compensation coefficient a set of calibration measurements is provided. In a sophisticated embodiment the compensation of I/Q imbalances and DC offsets is performed stepwise in coarse and fine calibration measurement sets. For instance, in a coarse calibration measurement set for coarse I/Q compensation the first I/Q compensation value is set on a positive predetermined constant and respective complex coarse I/Q compensation measurements are provided over a predetermined number of periods for averaging. Furthermore, the second I/Q compensation value is set on a negative predetermined constant and respective complex coarse I/Q compensation measurements are provided over predetermined periods. Subsequently, the next optimum coarse I/Q compensation value is determined by said I/Q compensation values and said complex coarse I/Q measurement results. In a fine calibration measurement set for fine I/Q compensation the first complex fine I/Q compensation value is given by the previous optimum and the positive predetermined constant and the second complex fine I/Q compensation value is given by the previous optimum and the negative predetermined constant.

Each of the calibration measurement sets is performed in same predetermined periods for averaging. Alternatively or additionally, the calibration measurement sets may be performed in different predetermined periods for averaging. These different periods for determining compensation values of the respective compensation coefficient allow a graduated calibration method for a fine and coarse compensation. As a preferred embodiment the predefined periods of coarse calibration measurement sets are lower than the predefined periods of fine calibration measurement sets. E.g. for a coarse calibration measurement set the predefined period for averaging is set onto 8 periods and for a fine calibration measurement set the predefined period is set onto 64 periods. This allows in an easier way a graduate calibration with fine and coarse calibration of the I/Q modulator.

In a further embodiment of the invention for each compensation coefficient a value range with a maximum compensation value and a minimum compensation value is predefined. In order to keep the value range, the next optimum value is observed. In case that a real part or an imaginary part of the next optimum value exceeds a limit of the given value range, this next optimum value is set on the given maximum or minimum compensation value.

Furthermore, the compensation values of the compensation coefficients can be determined under different working conditions, e.g. at different frequency conditions and/or temperature conditions and/or at a changed working status.

The compensation process is configured to compensate one or more imbalances. For instance, one of the compensation coefficients compensates amplitude and phase imbalance in the in-phase signal $s_I(t_k)$ and in the quadrature-phase signal $s_Q(t_k)$. Other compensation coefficients compensate D.C. offsets in the in-phase signal $s_I(t_k)$ and in the quadrature-phase signal $s_Q(t_k)$.

With regard to the system for calibrating an analogue I/Q-modulator of a transmitter the problem is solved with:

a baseband processor generating a calibration signal $s(t_k)$ as an input signal with an in-phase signal $s_I(t_k)$ and a quadrature-phase signal $s_Q(t_k)$, a digital compensation circuit for adjusting said in-phase signal $s_I(t_k)$ and said quadrature-phase signal $s_Q(t_k)$ by at least one complex compensation coefficient in two calibration steps, a I/Q modulator for modulating the adjusted in-phase signal and the adjusted quadrature-phase signal and for generating an RF output signal $s_{RF}(t)$, an analog detector circuit coupled to I/Q modulator and correlated with at least one of the harmonics $H_1$ or $H_2$ of said calibration signal $s(t_k)$ to provide complex measurement results for the two calibration steps and a determination circuit for determining next optimum compensation values of the complex compensation coefficients to pre-distort the in-phase signal $s_I(t_k)$ and the quadrature-phase signal $s_Q(t_k)$.

Furthermore, the system comprises a digital-analog converter coupled between the compensation circuit and the analog I/Q modulator that converts the digital in-phase signal $s_I(t_k)$ and the digital quadrature-phase signal $s_Q(t_k)$ into an analog I baseband signal and an analog Q baseband signal.

In a preferred embodiment, said detector circuit is a power detector for determining the output power of the RF output signal $s_{RF}(t)$. The detection and determination chain includes an analog-digital converter that digitizes the determined RF output signal $s_{RF}(t)$. The analog-digital converter is coupled to said detector circuit. The digitalized signals are fed into said determination circuit which is for instance a digital signal processor coupled to said detector circuit for determining the values of the relevant compensation coefficients.

DETAILED DESCRIPTION OF THE DRAWINGS

The present invention is described in more detail. In particular, the present invention will be described with an exemplary model developed for a detector circuit comprising a power detector.

Figure 1:
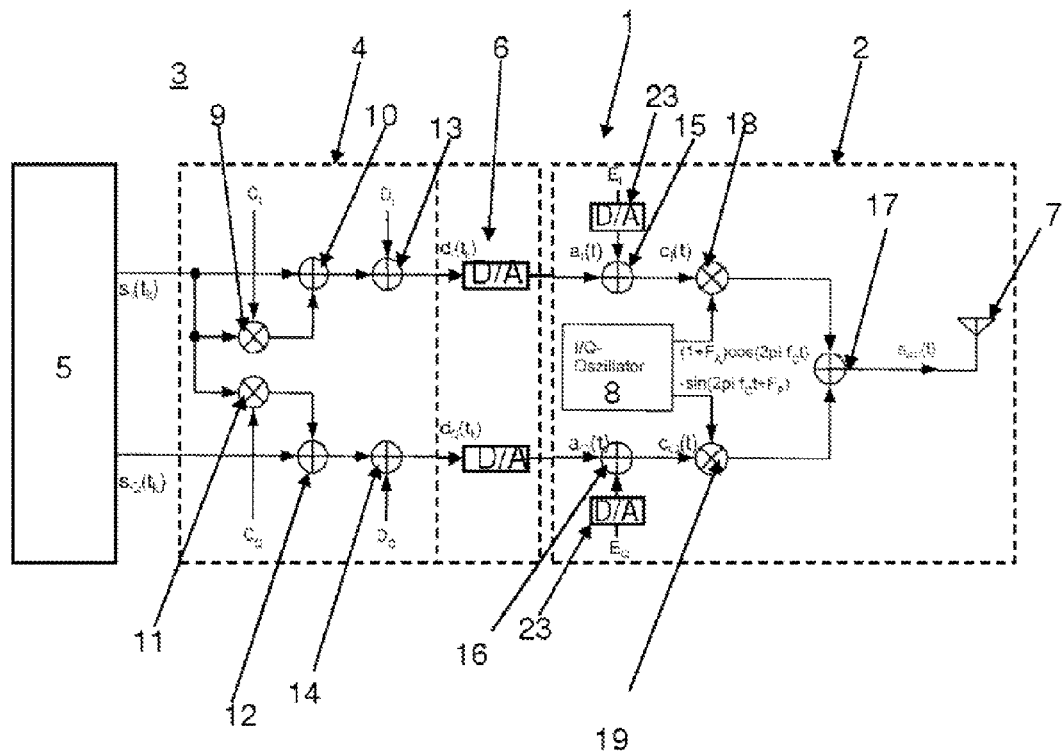
FIG. 1 shows a functional diagram of a transmitting part of a system for calibrating an analogue I/Q-modulator of a transmitter, comprising a compensation circuit and an I/Q-modulator.

FIG. 1 shows a functional diagram for a system for calibrating an analogue I/Q-modulator 2 of a for instance direct up-conversion transmitter 3 with a compensation circuit 4. The transmitter 3 may be used in radio communication devices such as WLAN transmitter or transceiver which may be integrated in several electronic devices such as in pocket PC's, in mobile phones, in digital cameras, etc.

The transmitting chain 1 comprises a baseband processor 5, said compensation circuit 4, a pair of digital-analog converters 6, said I/Q-modulator 2 and an antenna 7. The baseband processor 5 may be, for instance, a digital signal processor, central processing unit, or some other type of processing device or logic circuitry.

The baseband processor 5 generates a digital input signal $s(t_k)$ with an in-phase signal $s_I(t_k)$ and a quadrature-phase signal $s_Q(t_k)$ for RF transmission via the antenna 7.

Said in-phase signal $s_I(t_k)$ and quadrature-phase signal $s_Q(t_k)$ are adjusted by different compensation coefficients $C_{I/Q}$, $D_{I/Q}$ and/or $E_{I/Q}$ in the compensation circuit 4 by the following equations:

$$d_I(t_k) = C_I \cdot s_I(t_k) + s_I(t_k) + D_I$$

$$d_Q(t_k) = C_Q \cdot s_Q(t_k) + s_Q(t_k) + D_Q$$

where $d_I(t_k)$, $d_Q(t_k)$ are the digital input signals of the digital-analog converters 6, yielding the analog output signals $a_I(t)$ and $a_Q(t)$; $C_I$ and $C_Q$ are the coefficients for I/Q imbalance compensation; $D_I$ and $D_Q$ are the coefficients for digital fine DC offset compensation.

The adjusted digital in-phase signal $d_I(t_k)$ and the adjusted digital quadrature-phase signal $d_Q(t_k)$ are then converted into the analog domain by the pair of digital-analog converters 6 and are feed into the I/Q-modulator 2 for direct up-conversion.

Said I/Q modulator 2 contains an analog DC offset compensation circuit 15 described by the following equations:

$$c_I(t) = a_I(t) + V \cdot E_I,$$

$$c_Q(t) = a_Q(t) + V \cdot E_Q$$

where $E_I$ and $E_Q$ are the coefficients for analog coarse DC offset compensation and V describes the characteristic of the DC offset compensation of the digital-analog converters 23.

Although the coarse DC compensation coefficients $E_I$ and $E_Q$ and the fine DC compensation coefficients $D_I$ and $D_Q$ compensate the same impairment, namely DC offsets, it is an advantage to have both. Without the coarse DC offset compensation $E_I$ and $E_Q$, the fine DC offset compensation values $D_I$ and $D_Q$ could become so large that the dynamic range of the digital-analog converters 6 would be degraded.

The output signals $c_I(t)$ and $c_Q(t)$ of the compensation circuit 15 are fed into mixer 18 and 19, running at a RF carrier frequency from a local oscillator 8 and generating a RF output signal $s_{RF}(t)$ transmitted via the antenna 7. Additionally, further components such as amplifier, filter, e.g. low pass filters, may be included in the transmit chain 1.

Figure 2:
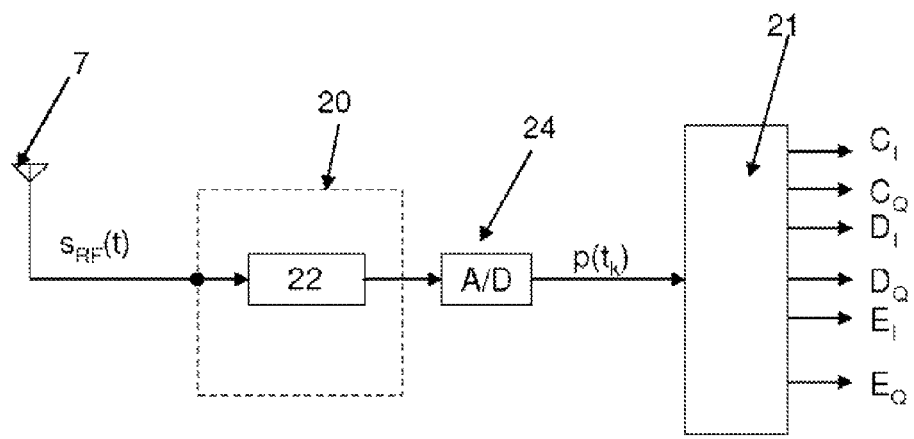
FIG. 2 shows a functional diagram of a detecting and determination part of a system for calibrating said analogue I/Q-modulator, comprising a detector circuit and a determination circuit.

The determination of the compensation coefficients $C_{I/Q}$, $D_{I/Q}$ and/or $E_{I/Q}$ is described now in more detail:

FIG. 2 shows a functional diagram of a detecting and determination part of a system for calibrating said analog I/Q-modulator 2, comprising a detector circuit 20 and a determination circuit 21.

Said analog detector circuit 20 may be coupled to the I/Q modulator 2 directly. In a preferred embodiment, said detector circuit 20 is a power detector 22 for determining the output power of the RF output signal $s_{RF}(t)$. The calibration method is robust versus the specific characteristic of the power detector 22, i.e. does not matter whether it is e.g. a linear or a logarithmic envelop detector. The detection and determination chain includes an analog-digital converter 24 coupled to said detector circuit 20. The analog-digital converter 24 converts the analog detector signal into the digital signal $p(t_k)$. This digitized signal $p(t_k)$ is fed into said determination circuit 21 which is for instance a digital signal processor coupled to said detector circuit 20 for determining the values of one or more relevant compensation coefficients $C_{I,Q}$, $D_{I,Q}$, $E_{I,Q}$.

When performing a calibration measurement set, the baseband processor 5 transmits a calibration signal $s(t_k)$ with a frequency $f_0$ according to:

$$s_I(t_k) = A \cdot \cos(2\pi \cdot f_0 \cdot t_k),$$

$$s_Q(t_k) = A \cdot \sin(2\pi \cdot f_0 \cdot t_k).$$

For DC offset measurements to determine DC offset compensation coefficients D and E, the determination circuit 21 correlates the power detector signal $p(t_k)$ with the same frequency $f_0$, especially with the first harmonic $H_1$ ($=1\,f_0$, fundamental frequency), according to:

$$v_I, w_I = \sum_{k=0}^{NM-1} p(t_k) \cdot \cos(2\pi \cdot f_0 \cdot t_k),$$

$$v_Q, w_Q = \sum_{k=0}^{NM-1} p(t_k) \cdot \sin(2\pi \cdot f_0 \cdot t_k).$$

where M is the number of samples of a single period of the calibration signal $s(t_k)$ with the frequency $f_0$ and N is the number of periods for averaging; v and w are the measurement results for the compensation coefficient E and D.

In a possible embodiment of this invention, the sampling rate is 20 MHz (i.e. $t_{k+1} - t_k = 50$ ns), the frequency $f_0$ is 312.5 kHz and the number of samples M is 64. The number of periods N for averaging could be different.

For I/Q imbalance compensation measurements to determine I/Q compensation coefficients C, the determination circuit 21 correlates the power detector signal $p(t_k)$ with the frequency $f_0$, especially with the second harmonic $H_2$ ($=2f_0$), according to:

$$u_I = \sum_{k=0}^{NM-1} p(t_k) \cdot \cos(4\pi \cdot f_0 \cdot t_k),$$

$$u_Q = \sum_{k=0}^{NM-1} p(t_k) \cdot \sin(4\pi \cdot f_0 \cdot t_k).$$

For describing the calculation of the next optimum compensation coefficients C, D and/or E, it is advantageous to introduce the complex notation:

| | |
|---|---|
| I/Q compensation | $C = C_I + j*C_Q$, |
| Coarse DC compensation | $E = E_I + j*E_Q$, |
| Fine DC compensation | $D = D_I + j*D_Q$, |
| I/Q measurement results | $u = u_I + j*u_Q$, |
| Coarse DC measurement results | $v = v_I + j*v_Q$, |
| Fine DC measurement results | $w = w_I + j*w_Q$. |

For I/Q compensation measurement n, two complex I/Q compensation values $C_{n,1}$ and $C_{n,2}$ are applied and the corresponding I/Q compensation measurement results are measured. Advantageously, the I/Q compensation values $C_{n,1}$, and $C_{1,2}$ are set as follows:

$$C_{n,1} = C_m + \Delta C_n$$

$$C_{n,2} = C_m - \Delta C_n$$

where $C_m$ is the previous optimum and $\Delta C_n$ is a predefined constant.

The next optimum I/Q compensation value $C_n$ is then given by:

$$C_n = (u_{n,2} \cdot C_{n,1} - u_{n,1} \cdot C_{n,2})/(u_{n,2} - u_{n,1}).$$

For coarse DC compensation, the same formulas hold, just I/Q compensation coefficient C replaced by the coarse DC compensation coefficient E:

$$E_n = (v_{n,2} \cdot E_{n,1} - v_{n,1} \cdot E_{n,2})/(v_{n,2} - v_{n,1}).$$

For fine DC compensation, the same formulas hold, just I/Q compensation coefficient C replaced by the fine DC compensation coefficient D:

$$D_n = (w_{n,2} \cdot D_{n,1} - w_{n,1} \cdot D_{n,2})/(w_{n,2} - w_{n,1}).$$

All compensation values $C_{I,Q}$, $D_{I,Q}$ and/or $E_{I,Q}$ are real numbers within a certain valid value range according to:

$$C_{min} <= C_I, C_Q <= C_{max},$$

$$D_{min} <= D_I, D_Q <= D_{max} \text{ and/or}$$

$$E_{min} <= E_I, E_Q <= E_{max}.$$

In order to not exceed these limits, real parts, e.g. $C_{n,I}$, and imaginary parts, $C_{n,Q}$ of the next optimum are checked versus the limits and saturated if a limit is exceeded, i.e. set to e.g. $C_{max}$ if the actual value>$C_{max}$ or set to $C_{min}$ if the actual value<$C_{min}$. In a possible embodiment, the limits are given by:

$$C_{min} = -512, C_{max} = 511,$$

$$D_{min} = -1024, D_{max} = 1023 \text{ and/or}$$

$$E_{min} = -15, E_{max} = 15$$

Furthermore, in the calibration mode according to the present invention a plurality of calibration measurement sets are provided—one or more than one set for each compensation coefficient $C_{I/Q}$, $D_{I/Q}$, $E_{I/Q}$; each of them includes two calibration steps for each coefficient $C_{I/Q}$, $D_{I/Q}$, $E_{I/Q}$. In detail:

1. Initialization

All compensation coefficients are set to zero:
Set $C_0 = 0$, $D_0 = 0$, $E_0 = 0$.

2. Coarse DC compensation (=first calibration measurement set)

Set $E_{1,1} = \Delta E_1$, measure $v_{1,1}$ using $N_1$ periods for averaging (=first calibration step), Set $E_{1,2} = -\Delta E_1$, measure $v_{1,2}$ using $N_1$ periods for averaging (=second calibration step).

Set next optimum $E_1 = \text{Sat}\{[v_{1,2} \cdot E_{1,1} - v_{1,1} \cdot E_{1,2}]/(v_{1,2} - v_{1,1})\}$ 3. Coarse I/Q compensation (=second calibration measurement set)

Set $C_{2,1} = \Delta C_2$, measure $u_{2,1}$ using $N_2$ periods for averaging (=first calibration step), Set $C_{2,2} = -\Delta C_2$, measure $u_{2,2}$ using $N_2$ periods for averaging (=second calibration step).

Set next optimum $C_2 = \text{Sat}\{[u_{2,2} \cdot C_{2,1} - u_{2,1} \cdot C_{2,2}]/(u_{2,2} - u_{2,1})\}$ 4. Fine DC compensation (=third calibration measurement set)

Set $D_{3,1} = \Delta D_3$, measure $w_{3,1}$ using $N_3$ periods for averaging (=first calibration step), Set $D_{3,2} = -\Delta D_3$, measure $w_{3,2}$ using $N_3$ periods for averaging (=second calibration step).

Set next optimum $D_3 = \text{Sat}\{[w_{3,2} \cdot D_{3,1} - w_{3,1} \cdot D_{3,2}]/(w_{3,2} - w_{3,1})\}$ 5. Fine I/Q compensation (=fourth calibration measurement set)

Set $C_{4,1} = C_2 + \Delta C_4$, measure $u_{4,1}$ using $N_4$ periods for averaging (=first calibration step), Set $C_{4,2} = C_2 - \Delta C_2$, measure $u_{4,2}$ using $N_4$ periods for averaging (=second calibration step).

Set next optimum $C_4 = \text{Sat}\{[u_{4,2} \cdot C_{4,1} - u_{4,1} \cdot C_{4,2}]/(u_{4,2} - u_{4,1})\}$ Each calibration measurement set may be performed in a same predetermined period N for averaging. Preferably, the periods for averaging are different for fine and coarse compensation. In one embodiment the following periods $N_1$ to $N_4$ are used:

$N_1 = N_2 = 8$ for coarse calibration measurement sets and
$N_3 = N_4 = 64$ for fine calibration measurement sets.

Such linear compensation method with predefined values reduces the number of calibration measurements to two measurements. Usually, further iterations do not improve the result.

Furthermore, the compensation coefficients $C_{I/Q}$, $D_{I/Q}$ and/or $E_{I/Q}$ may be determined and calculated under different working conditions, e.g. at different frequency conditions and/or temperature conditions and/or at a changed working status.

In a further alternate embodiment, the baseband processor 5 and the determination circuit 21 may be the same digital signal processing unit, such as a digital signal processor, a central processing unit, or some other type of processing device or logic circuitry digital processing unit.

The invention claimed is:

1. A method for calibrating an analog I/Q-modulator of a transmitter, comprising the steps of:

adjusting a calibration signal with a first predetermined compensation value;

correlating a first harmonic of the calibration signal with a first detector circuit output to result in a first complex compensation measurement result;

adjusting the calibration signal with a second predetermined compensation value;

correlating a second harmonic of the calibration signal with a second detector circuit output to result in a second complex compensation measurement result;

generating an optimum compensation value by using the first and second predetermined compensation values and the first and second complex compensation measurement results;

adding a positive offset to the first predetermined compensation value;

subtracting a negative offset from the second predetermined compensation value;

generating a first complex coarse compensation measurement result or a first complex fine compensation measurement result over a predetermined period for averaging; and generating a first optimum coarse compensation value or a first optimum fine compensation value.

2. The method according to claim 1, wherein the first and second predetermined compensation values are each set to a minimum or maximum value where a minimum or maximum value, respectively, is exceeded.

3. The method according to claim 1, wherein the adjusting, correlating, and generating steps occur under varied working conditions.

4. The method according to claim 1, wherein the first and second predetermined compensation values are set to zero before adjusting the calibration signal.

5. The method according to claim 1, wherein the first and second detector circuit output may be equal.

6. The method according to claim 1, wherein the first and second harmonic of the calibration signals may be equal.

7. The method according to claim 1, wherein the first and second predetermined compensation values may be equal.

8. The method according to claim 1, wherein the calibration signal consists of an in-phase signal and a quadrature-phase signal.

9. The method according to claim 1, wherein the first and second predetermined compensation values are first and second complex I/Q compensation coefficients for I/Q compensation, respectively.

10. The method according to claim 9, wherein the first and second complex compensation measurement results are first and second complex I/Q compensation measurement results, respectively.

11. The method according to claim 10, wherein the optimum compensation value is an optimum I/Q compensation value.

12. The method according to claim 11, wherein the adding includes adding the positive offset to the first complex I/Q compensation coefficient for I/Q compensation, wherein the subtracting includes subtracting the negative offset from the second complex I/Q compensation coefficient for I/Q compensation, wherein the generating the first complex coarse compensation measurement result or the first complex fine compensation measurement result includes generating a first complex coarse I/Q compensation measurement result over the predetermined period for averaging, and wherein the generating the first optimum coarse compensation value or the first optimum fine compensation value includes generating a first optimum coarse I/Q compensation value.

13. The method according to claim 12, wherein the first and second complex I/Q compensation coefficients are set to zero before adjusting the calibration signal.

14. The method according to claim 12, wherein the first and second complex I/Q compensation coefficients are each set to a minimum or maximum value where a minimum or maximum value, respectively, is exceeded.

15. The method according to claim 10, wherein the adding includes adding the positive offset to the first complex I/Q compensation coefficient for I/Q compensation, wherein the subtracting includes subtracting the negative offset from the second complex I/Q compensation coefficient for I/Q compensation, wherein the generating the first complex coarse compensation measurement result or the first complex fine compensation measurement result includes generating a first complex fine I/Q compensation measurement result over the predetermined period for averaging, and wherein the generating the first optimum coarse compensation value or the first optimum fine compensation value includes generating a first optimum fine I/Q compensation value.

16. The method according to claim 15, wherein the first and second complex I/Q compensation coefficients are set to zero before adjusting the calibration signal.

17. The method according to claim 15, wherein the first and second complex I/Q compensation coefficients are each set to a minimum or maximum value where a minimum or maximum value, respectively, is exceeded.

18. The method according to claim 1, wherein the first and second predetermined compensation values are first and second complex coarse DC compensation coefficients, respectively.

19. The method according to claim 18, wherein the first and second complex compensation measurement results are first and second complex coarse DC compensation measurement results, respectively.

20. The method according to claim 19, wherein the optimum compensation value is an optimum coarse DC compensation value.

21. The method according to claim 20, wherein the adding includes adding the positive offset to the first complex coarse DC compensation coefficient, wherein the subtracting includes subtracting the negative offset from the second complex coarse DC compensation coefficient, wherein the generating the first complex coarse compensation measurement result or the first complex fine compensation measurement result includes generating a first complex coarse DC compensation measurement result over the predetermined period for averaging, and wherein the generating the first optimum coarse compensation value or the first optimum fine compensation value includes generating a first optimum coarse DC compensation value.

22. The method according to claim 21, wherein the first and second complex coarse DC compensation coefficients are set to zero before adjusting the calibration signal.

23. The method according to claim 21, wherein the first and second complex coarse DC compensation coefficients are each set to a minimum or maximum value where a minimum or maximum value, respectively, is exceeded.

24. The method according to claim 1, wherein the first and second predetermined compensation values are first and second complex fine DC compensation coefficients, respectively.

25. The method according to claim 24, wherein the first and second complex compensation measurement results are first and second complex fine DC compensation measurement results, respectively.

26. The method according to claim 25, wherein the optimum compensation value is an optimum fine DC compensation value.

27. The method according to claim 26, wherein the adding includes adding the positive offset to the first complex fine DC compensation coefficient, wherein the subtracting includes subtracting the negative offset from the second complex fine DC compensation coefficient, wherein the generating the first complex coarse compensation measurement result or the first complex fine compensation measurement result includes generating a first complex fine DC compensation measurement result over the predetermined period for averaging, and wherein the generating the first optimum coarse compensation value or the first optimum fine compensation value includes generating a first optimum fine DC compensation value.

28. The method according to claim 27, wherein the first and second complex fine DC compensation coefficients are set to zero before adjusting the calibration signal.

29. The method according to claim 27, wherein the first and second complex fine DC compensation coefficients are each set to a minimum or maximum value where a minimum or maximum value, respectively, is exceeded.

30. A method for calibrating an analog I/Q-modulator of a transmitter, comprising:
    generating a calibration signal with a baseband processor;
    adjusting the calibration signal by one or more complex compensation coefficients in two steps by using a digital compensation circuit coupled to the baseband processor;
    modulating the adjusted calibration signal and generating an RF output signal by using an I/Q modulator coupled to the digital compensation circuit and baseband processor;
    receiving one or more harmonic signals of the calibration signal and generating complex measurement results over the two steps by using an analog detector circuit coupled to the I/Q modulator;
    determining optimum complex compensation coefficients in order to pre-distort the calibration signal by using a determination circuit coupled to the analog detector circuit,
    adding a positive offset to a first complex compensation coefficient of the one or more complex compensation coefficients;
    subtracting a negative offset from a second complex compensation coefficient of the one or more complex compensation coefficients;
    generating a first complex coarse compensation measurement result or a first complex fine compensation measurement result over a predetermined period for averaging; and
    generating a first optimum coarse compensation value or a first optimum fine compensation value.

31. The method according to claim 30, wherein the calibration signal is an in-phase signal and a quadrature-phase signal.

32. The method according to claim 30 further comprising converting the calibration signal into an analog I-baseband signal and an analog Q-baseband signal by using a digital-to-analog converter coupled to the compensation circuit and the I/Q modulator.

33. The method according to claim 30, further comprising determining the output power of the RF output signal by using the analog detector circuit.

34. The method according to claim 33, further comprising digitizing the determined output power of the RF output signal by using an analog-to-digital converter coupled to the analog detector circuit.

35. A system for calibrating an analog I/Q-modulator of a transmitter, comprising:
    a baseband processor for generating a calibration signal;
    a digital compensation circuit coupled to the baseband processor for adjusting the calibration signal by one or more complex compensation coefficients in two steps;
    an I/Q modulator coupled to the digital compensation circuit and baseband processor for modulating the adjusted calibration signal and generating an RF output signal;
    an analog detector circuit coupled to the I/Q modulator for receiving one or more harmonic signals of the calibration signal and generating complex measurement results over the two steps;
    a determination circuit coupled to the analog detector circuit for determining optimum complex compensation coefficients in order to pre-distort the calibration signal,
    wherein a positive offset is added to a first complex compensation coefficient of the one or more complex compensation coefficients,
    wherein a negative offset is subtracted from a second complex compensation coefficient of the one or more complex compensation coefficients,
    wherein the analog detector circuit is configured to generate a first complex coarse compensation measurement result or a first complex fine compensation measurement result over a predetermined period for averaging, and
    wherein the determination circuit is configured to generate a first optimum coarse compensation value or a first optimum fine compensation value.

36. The system according to claim 35, wherein the calibration signal is an in-phase signal and a quadrature-phase signal.

37. The system according to claim 35, further comprising a digital-to-analog converter coupled to the compensation circuit and the I/Q modulator to convert the calibration signal into an analog I-baseband signal and an analog Q-baseband signal.

38. The system according to claim 35, wherein the analog detector circuit is a power detector that also determines the output power of the RF output signal.

39. The system according to claim 38, further comprising an analog-to-digital converter coupled to the analog detector circuit for digitizing the determined output power of the RF output signal.

40. The system according to claim 35, wherein the determination circuit is a digital signal processor.

* * * * *